United States Patent [19]

Fraioli

[11] Patent Number: 4,510,212

[45] Date of Patent: Apr. 9, 1985

[54] SOLID OXIDE FUEL CELL HAVING COMPOUND CROSS FLOW GAS PATTERNS

[75] Inventor: Anthony V. Fraioli, Hawthorn Woods, Ill.

[73] Assignee: The United States of America as represented by the United States Department of Energy, Washington, D.C.

[21] Appl. No.: 541,176

[22] Filed: Oct. 12, 1983

[51] Int. Cl.³ .......................................... H01M 8/10
[52] U.S. Cl. ...................................... 429/30; 429/38; 429/39
[58] Field of Search ................ 429/30, 31, 32, 33, 429/38, 39, 40, 34, 46, 72

[56] References Cited

U.S. PATENT DOCUMENTS

| | | | |
|---|---|---|---|
| 3,558,360 | 1/1971 | Sverdrup et al. | 136/86 |
| 3,617,385 | 11/1971 | Gray | 136/86 |
| 3,754,995 | 8/1973 | Kleinschmager | 136/86 R |
| 3,834,943 | 9/1974 | Van den Berghe et al. | 136/86 D |
| 3,905,775 | 9/1975 | Sowards et al. | 23/288 FC |
| 4,292,379 | 9/1981 | Kothmann | 429/34 X |
| 4,324,844 | 4/1982 | Kothmann | 429/34 X |
| 4,345,008 | 8/1982 | Breault | 439/34 X |
| 4,366,211 | 12/1982 | Pollock | 429/38 |
| 4,431,715 | 2/1984 | Isenberg | 429/30 |
| 4,444,851 | 4/1984 | Maru | 429/34 X |

Primary Examiner—Charles F. LeFevour
Attorney, Agent, or Firm—Charles F. Lind; Hugh W. Glenn; Robert J. Fisher

[57] ABSTRACT

A core construction for a fuel cell is disclosed having both parallel and cross flow passageways for the fuel and the oxidant gases. Each core passageway is defined by electrolyte and interconnect walls. Each electrolyte wall consists of cathode and anode materials sandwiching an electrolyte material. Each interconnect wall is formed as a sheet of inert support material having therein spaced small plugs of interconnect material, where cathode and anode materials are formed as layers on opposite sides of each sheet and are electrically connected together by the interconnect material plugs. Each interconnect wall in a wavy shape is connected along spaced generally parallel line-like contact areas between corresponding spaced pairs of generally parallel electrolyte walls, operable to define one tier of generally parallel flow passageways for the fuel and oxidant gases. Alternate tiers are arranged to have the passageways disposed normal to one another. Solid mechanical connection of the interconnect walls of adjacent tiers to the opposite sides of the common electrolyte wall therebetween is only at spaced point-like contact areas, 90 where the previously mentioned line-like contact areas cross one another.

20 Claims, 5 Drawing Figures

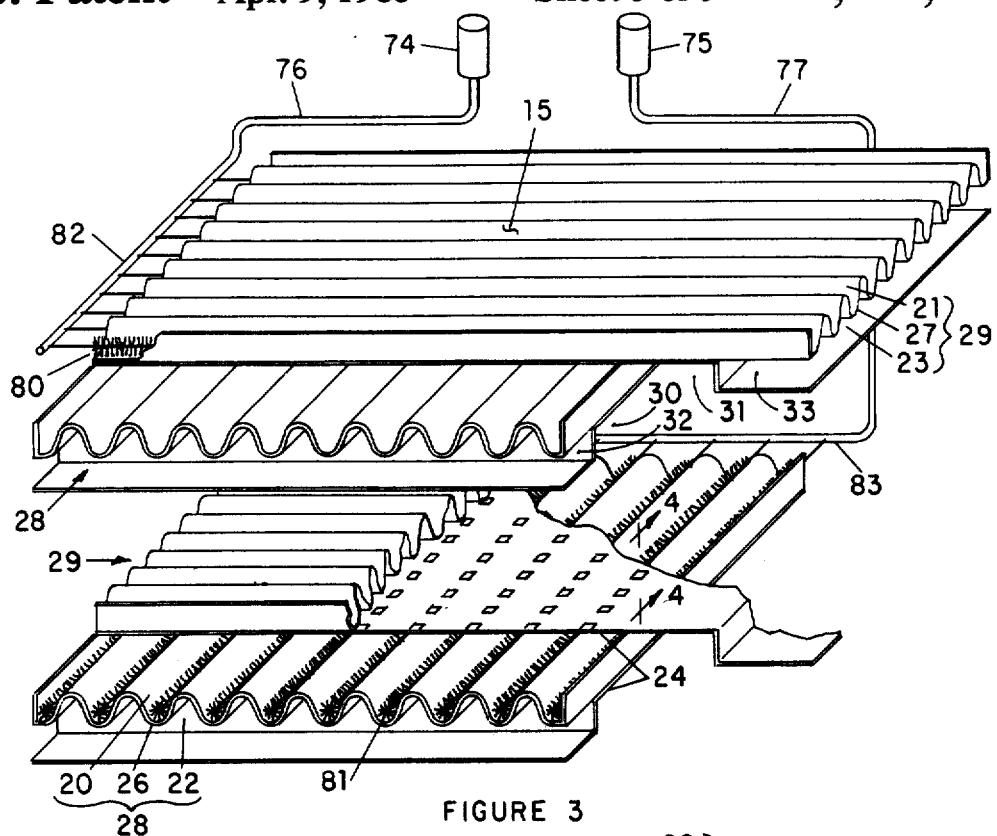
FIGURE 3
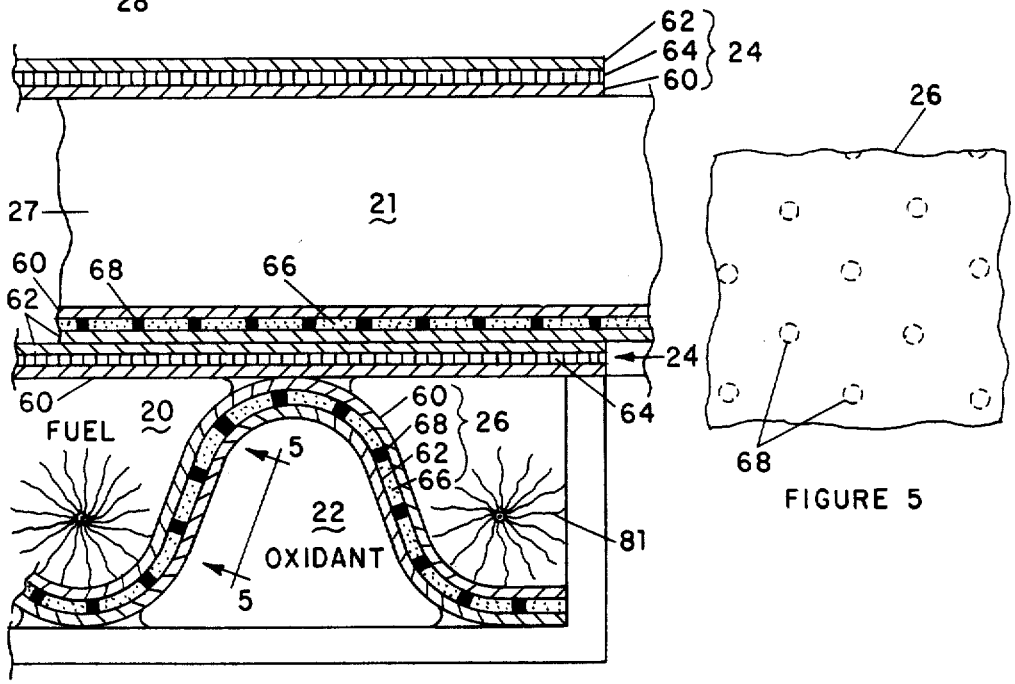
FIGURE 4
FIGURE 5

SOLID OXIDE FUEL CELL HAVING COMPOUND CROSS FLOW GAS PATTERNS

CONTRACTUAL ORIGIN OF THE INVENTION

The U.S. Government has rights in this invention pursuant to Contract No. W-31-109-ENG-38 between the U.S. Department of Energy and the University of Chicago representing Argonne National Laboratory.

BACKGROUND OF THE INVENTION

A fuel cell is basically a galvanic energy conversion device that chemically combines hydrogen or a hydrocarbon fuel and an oxidant within catalytic confines to produce a DC electrical output. In one form of fuel cell, cathode material defines the passageways for the oxidant and anode material defines the passageways for the fuel, and an electrolyte separates the cathode and anode materials. The fuel and oxidant, typically as gases, are then continuously passed through the cell passageways separated from one another, and unused fuel and oxidant discharged from the fuel cell generally also remove the reaction products and heat generated in the cell. Being infeeds, the fuel and oxidant are typically not considered an integral part of the fuel cell itself.

The type of fuel cell for which this invention has direct applicability is known as the solid electrolyte or solid oxide fuel cell, where the electrolyte is in solid form in the fuel cell. In the solid oxide fuel cell, hydrogen or a high order hydrocarbon is used as the fuel and oxygen or air is used as the oxidant, and the operating temperatures of the fuel cell is between 700° and 1,100° C.

The hydrogen reaction on the anode (the negative electrode) with oxide ions generates water with the release of electrons; and the oxygen reaction on the cathode with the electrons effectively forms the oxide ions. Electrons flow from the anode through the appropriate external load to the cathode, and the circuit is closed internally by the transport of oxide ions through the electrolyte. The electrolyte insulates the cathode and anode from one another with respect to electron flow, but permits oxygen ions to flow from the cathode to the anode. Thus, the reactions are, at the:

cathode $\frac{1}{2} O_2 + 2e^- \rightarrow O^{-2}$ (1)

anode $H_2 + O^{-2} \rightarrow H_2O + 2e^-$. (2)

The overall cell reaction is $H_2 + \frac{1}{2} O_2 \rightarrow H_2O$. (3)

In addition to hydrogen, the fuel can be derived from a hydrocarbon such as methane ($CH_4$) reformed by exposure to steam at 350° C. or above, which initially produces carbon monoxide (CO) and three molecules of hydrogen. As hydrogen is consumed, a shift in reaction occurs to $CO + H_2O \rightarrow CO_2 + H_2$. (4)

The overall reaction of hydrocarbons in the cell is illustrated by $CH_4 + 2O_2 \rightarrow CO_2 + 2H_2O$. (5)

Inasmuch as the conversion is electrochemical, the thermal limitations of the Carnot cycle are circumvented; therefore efficiencies in the range exceeding 50% fuel heat energy conversion to electrical output can be theoretically obtained. This is much higher than equivalent thermal engines utilizing the same fuel conversion, including even a conventional diesel powered engine.

The electrolyte isolates the fuel and oxidant gases from one another while providing a medium allowing the ionic transfer and voltage buildup across the electrolyte. The electrodes (cathode and anode) provide paths for the internal movement of electrical current within the fuel cell to the cell terminals, which also connect then with an external load. The operating voltage across each cell is of the order of 0.7 volts maximum, so the individual cells must be placed in electrical series to obtain a useful load voltage. A series connection is accomplished between adjacent cells with an interconnect material which isolates the fuel and oxidant gases from one another while yet electronically connects the anode of one cell to the cathode of an adjoining cell. As the active electrochemical generation of electricity takes place only across the electrolyte portions of the fuel cell, any interconnect separation between the cathode and anode in order to provide the series electrical connection between the cells renders that part of the fuel cell electrically nonproductive. The percentage of interconnect to electrolyte wall area defining each cell, if high, could significantly reduce the energy or power densities of such a fuel cell.

Diffusion of the reacting species (fuel or oxidant) through the electrodes to the electrolyte also limits the cell performance. Fuel and oxidant must diffuse away from the flow in the respective passageways through the electrolyte to the reaction sites. The fuel and oxidant diffuse through the electrodes to the electrolyte and react at (or near) the three-phase boundary of the gases, the electrodes (anode or cathode), and electrolyte, where electrochemical conversion occurs. As the hydrogen partial pressure of the fuel gases decreases along the length of the fuel passageways, less voltage is generated near or at the downstream end of the fuel passageways.

While it is possible to thermally and electrically extract great quantities of energy from the fuel, it is also inherently inefficient to extract such energies to the complete depletion of the fuel and oxidant. Complete conversion of the fuel in the fuel cell is thus not sought as it is intrinsically inefficient in the overall output of the cell voltage. For both a single cell and cells in gas flow series, the maximum theoretical voltage decreases along the cell. Practical fuel cells therefore consume only 80 to 90% of the fuel because the cell voltage decreases rapidly as the hydrogen becomes less than 5% of the fuel gas. The reduction in maximum cell voltage as the fuel is consumed is an important limitation.

One proposed series of solid oxide fuel cells utilizes a ceramic support tube, and the electrodes (anode and cathode) and electrolyte are built up as layers on the support tube. The support tube is confined in a sealed housing, and the fuel and oxidant are manifolded to the housing and the reaction products are ported from the housing as required. Depending on the layer build-up, the fuel is either conveyed internally of the support tube and the oxidant is conveyed externally of the support tube (or vice versa). A practical fuel cell unit would be composed of many such tubes supported within an exterior housing, and manifolding would separate and direct the fuel and oxidant proximate the tubes.

A typical support tube might be formed of calcium stabilized zirconia ($ZrO_2 + CaO$); the cathode typically would be applied to the exterior face of the support tube and might be in the form of lanthanum manganite ($LaMnO_3$); the electrolyte would be layered over a portion of the cathode, comprised, for example, of yttria-stabilized zirconia ($ZrO_2 + Y_2O_3$); and the anode would be layered over the electrolyte comprised, for example, of a cobalt yttria-stabilized zirconia cermet or mixture ($Co + ZrO_2 + Y_2O_3$). The oxidant would thereby flow internally of the structural tube while fuel will be circulated externally of the tube. For part of the cell where a series connection was to be made with an adjacent cell, the interconnection would be layered over the cathode at this location instead of the electrolyte and anode, to engage the anode of the adjacent cell. The interconnect might be comprised for example, of lanthanum chromite ($LaCrO_3$).

To form this type of fuel cell, the support tube must be formed with a high degree of porosity. Even with 40% porosity, the layered anode and cathode represent large diffusion barriers. The diffusion losses increase very steeply at high current densities and represent a limit on current and hence power. The minimum size of the support tube has been about 1 cm in diameter, with a side wall about 1 mm thick. A limiting factor of this support tube core arrangement is the length of path that the current must pass along the cathode and anode materials thereby inducing significant electrical resistant losses. In one effort to minimize this, the respective tubes have been shortened lengthwise and stacked end-to-end on one another, and the anodes and cathodes of the successive respective tubes have been interconnected in a serial fashion with an interconnect. This renders a single tube through which the fuel and/or oxidant passes, while the serial connection produces a higher voltage cumulative of the total number of serially interconnected individual tubes. The current flow is in line with the direction of the fuel and/or oxidant flow, namely axially of the tube configuration.

An alternate construction provides an electrical interconnect at a chordal arc section of the tube connected to the interior anode, for example, whereby adjacent tubes are stacked tangentially adjacent one another to establish a cathode-anode serial arrangement. As the current must pass circumferentially along the cathode and anode materials, significant electrical resistance losses are incurred.

Another problem with solid oxide fuel cells is the differential thermal expansion and contraction between the electrode, interconnect and electrolyte materials and between the porous support material used in the construction. Although efforts are made to balance the specific coefficients of thermal expansion of the materials, even slight differences in the coefficients can be a problem particularly in the contact areas where the core walls of different material layer construction joined together. Differential thermal expansion is a problem since the start up thermal swing is quite large (between 25° C. and possibly 700°-1000° C., and the smaller cyclic thermal swings (between possibly 700° and 1000° C. or higher incurred at the varying output levels of the cell) are yet reasonably large and possibly frequent. Thus, the composite layered structure, upon any differential thermal expansion, can be differentially strained, and the layers can then tend to separate from one another.

SUMMARY OF THE INVENTION

This invention provides an improved fuel cell construction having a composite electrolyte wall structure formed of layers of cathode and anode materials sandwiching a thin layer of electrolyte material, and having a composite interconnect wall structure formed of layers of the cathode and anode material sandwiching a thin composite layer of interconnect and support materials. The electrolyte wall structures are of generally planar configurations and are located in the finished core in generally parallel spaced apart relation to one another. The interconnect wall structures are wavy, each extending between respective adjacent pairs of the electrolyte walls operable to define an array of separate parallel flow passageways suited for containing the fuel and oxidant gases.

A basic object of this invention is to provide an improved fuel cell core construction that minimizes the adverse effects of differential thermal expansion of the materials involved. Thus, spaced and parallel line contacts are established between the individual interconnect wall and the adjacent electrolyte walls, the alternate tiers of the parallel flow passageways are disposed transverse to one another so that the line contacts of the interconnect walls on opposite sides of the same electrolyte wall cross at spaced point-like locations. This provides solid mechanical connections only at these spaced locations between the electrolyte and interconnect walls, whereby the electrolyte walls are otherwise mechanically unrestrained.

Another object of this invention is to provide manifolding for the fuel and oxidant gases to the stacked tier array of flow passageways in the core, the flow passageways of each tier being parallel to one another but the flow passageways of alternate tiers being transverse to one another.

Another object of this invention is to provide interconnect wall structure formed by a generally continuous layer of an inert structural material having a matrix of many small plugs of interconnect material extended therethrough and by thin layers of the electrode anode and cathode materials sandwiching the support layer and being electrically connected together by the plugs of interconnect material. The inert material layer can be between 2 and 98% of the interconnect wall thickness so as to dominate the thermal expansion of the wall and thereby minimize adverse effects of possible differential thermal expansion.

A more detailed object of this invention is to provide a technique for fabricating the fuel cell, the electrolyte wall structure each being formed with the cathode, electrolyte and anode materials layered on one another, the interconnect wall structures each being formed with the inert support materials plugged with the interconnect and layered with the cathode and anode materials, the interconnect wall structure being ruckled or backfolded on itself and built up on a planar electrolyte wall structure to form a first cell tier, and additional similar cell tiers being built up on one another to define a multitier cell assembly. The assembly is then heat set to fuse the materials together into a rigid dimensionally stable core. By having the alternate cell tiers disposed with flow passages extended transverse to one another; only spaced point-like fused contact areas exist between the electrolyte and interconnect wall structures of the adjacent cell tiers so as to minimize the effects of differential thermal expansion.

RELATED COFILED APPLICATIONS AND INVENTIONS

The application Ser. No. 541,213 entitled "Solid Oxide Fuel Cell Having Monolithic Core" cofiled herewith having John P. Ackerman and John E. Young as joint inventors, discloses a monolithically formed core consisting only of materials active in the electrochemical reactions. This means that the electrolyte and interconnect walls of the core would be formed respectively, only of anode and cathode materials layered on the opposite sides of electrolyte material, or on the opposite sides of interconnect material. This allows the use of very thin material layers and very thin resulting composite core walls. The thin composite core walls can be shaped to define small passageways, while yet having sufficient structural integrity to withstand the fluid pressures generated by gas flow through the passageways and the mechanical stresses due to the weight of the stacked core walls on one another. This beneficially increases the power density of the fuel cell because of its reduced size and weight.

The application Ser. No. 541,184 entitled "Method of Fabricating a Monolithic Core For a Solid Oxide Fuel Cell" cofiled herewith having Stanley A. Zwick and John P. Ackerman as joint inventors, discloses the repetitive and sequential application of deposits of each of the anode, cathode, electrolyte and interconnect materials onto itself for building up the interconnect and electrolyte core walls endwise of the walls or in line with the flow passageways defined by the walls. Each separate deposit of each separate material is made over the entire core cross section simultaneously, whereby complicated shapes or cross sections of the flow passageways for the fuel and oxidant can be made as simply as can regular or symmetrical overall cross sections be made.

The application Ser. No. 541,178 entitled "Integral Manifolding Structure For Fuel Cell Core Having Parallel Gas Flow" cofiled herewith having Joseph E. Herceg as sole inventor, discloses means for directing the fuel and oxidant gases to parallel flow passageways in the core. A core wall projects beyond the open ends of the defined core passageways and is disposed approximately midway between and parallel to the adjacent overlying and underlying interconnect walls to define manifold chambers therebetween on opposite sides of the wall. Each electrolyte wall defining the flow passageways is shaped to blend into and be connected to this wall in order to redirect the corresponding fuel and oxidant passageways to the respective manifold chambers either above or below this intermediate wall. Inlet and outlet connections are made to these separate manifold chambers respectively, for carrying the fuel and oxidant gases to the core, and for carrying their reaction products away from the core.

The application Ser. No. 541,177 entitled "Solid Oxide Fuel Cell Having Monolithic Cross Flow Core and Manifolding" cofiled herewith having Roger B. Poeppel and Joseph T. Dusek as joint inventors, discloses a monolithic core construction having the flow passageways for the fuel and for the oxidant gases extended transverse to one another, whereby full face core manifolding can be achieved for these gases and their reaction products. The core construction provides that only anode material surround each fuel passageway and only cathode material surround each oxidant passageway, each anode and each cathode material further being sandwiched at spaced opposing sides between electrolyte and interconnect materials. These composite anode and cathode wall structures are further alternately stacked on one another (with the separating electrolyte or interconnect material typically being a single common layer) whereby the fuel and oxidant passageways are disposed transverse to one another.

BRIEF DESCRIPTION OF THE DRAWINGS

FIG. 3 is a perspective view, similar to FIG. 1, except being somewhat enlarged and showing only parts of the fuel cell core construction;

FIG. 4 is a greatly enlarged sectional view as seen from line 4—4 in FIG. 3; and FIG. 5 is a partial elevational view as seen from line 5—5 in FIG. 4 respectively.

DETAILED DESCRIPTION OF THE PREFERRED EMBODIMENT

Figure 1:
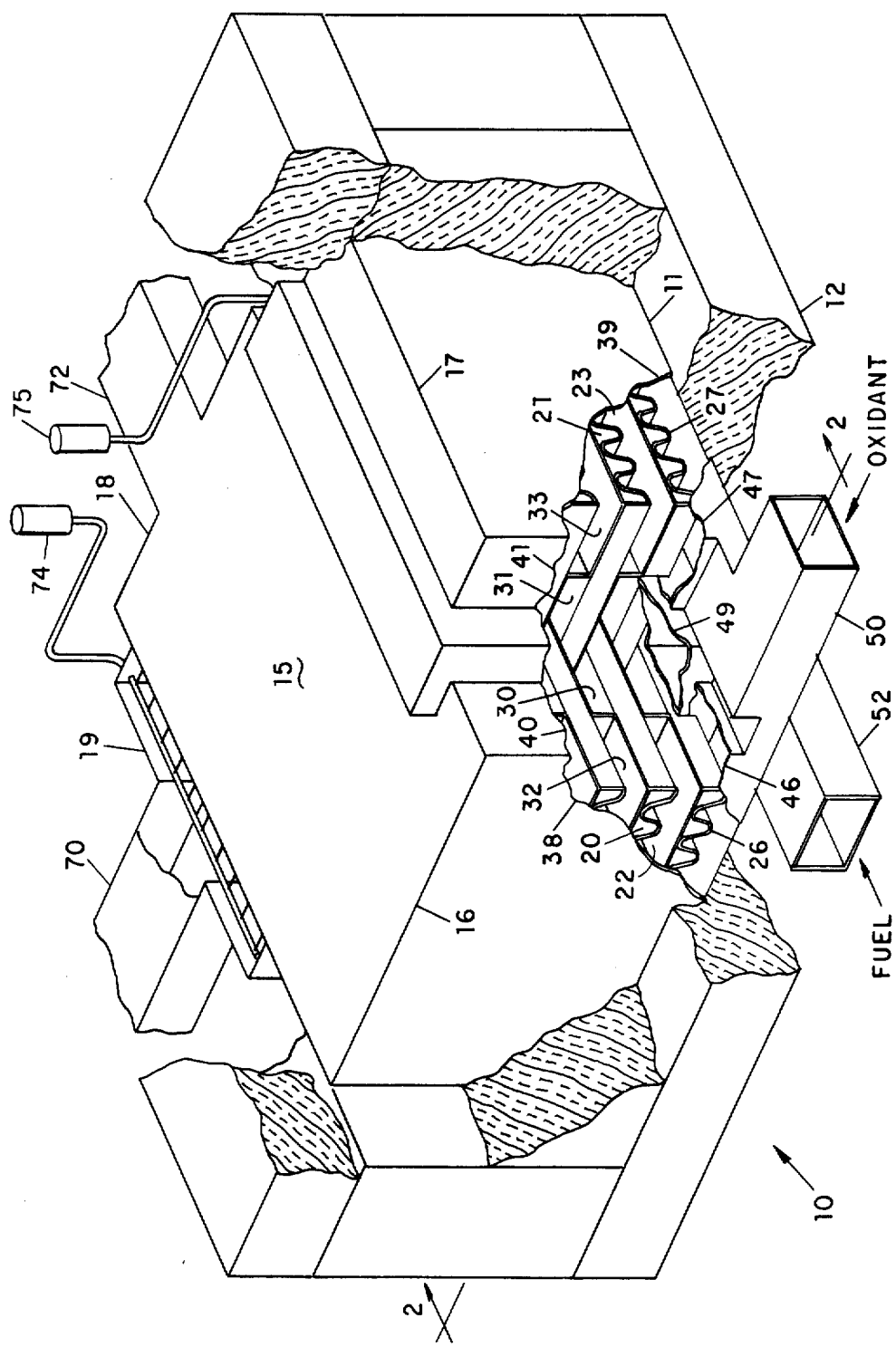
FIG. 1 is a perspective view, partly broken away for clarity of disclosure, of a fuel cell formed according to a preferred embodiment of the invention.
Figure 2:
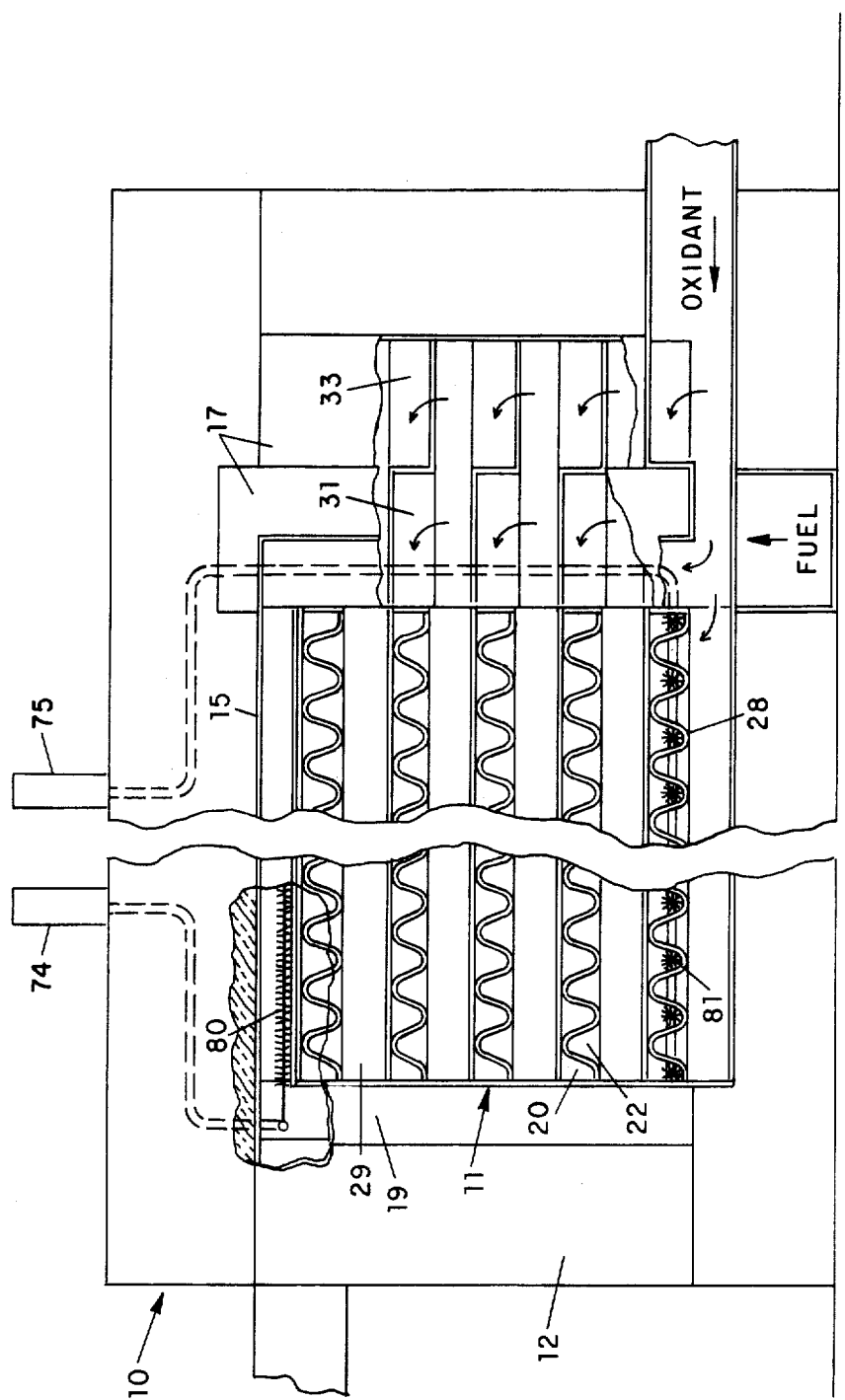
FIG. 2 is an enlarged sectional view as seen generally from line 2—2 in FIG. 1, illustrating additional details of construction of the invention.

FIGS. 1 and 2 illustrate a fuel cell 10 having a core 11 located within and surrounded by insulation 12. The core 11 has a central electrode region 15 and spaced endward manifolding regions 16, 17, 18 and 19. Passageways 20 and 22 extend through the central electrode region 15 of the core 11 between manifolding regions 16 and 18; and passageways 21 and 23 extend through the central electrode region of the core between the manifolding regions 17 and 19.

Specifically, the individual flow passageways 20 and 22 are parallel to one another and passageways 21 and 23 are parallel to one another; and the passageways 20 and 22 are transverse to the passageways 21 and 23. In the illustration, the passageways 20 and 22, and 21 and 23, are defined between generally spaced and parallel electrolyte walls 24 (see FIG. 4) and wavy and backfolded interconnect walls 26 and 27 extended between adjacent pairs of the electrolyte walls 24. The passageways 20 (and 21) are each above its interconnect wall 26 (and 27) and the passageways 22 (and 23) are each below the same interconnect wall. Each pairing of flow passageways 20 and 22 is considered a tier 28, and each pairing of passageways 21 and 23 is considered a tier 29 in the array of core passageways. Each of the passageways 20, 21, 22 and 23 has the approximate shape of a parabola when viewed in the direction of flow of the gases.

In the fuel cell shown herein, alternate tiers (28 for flow passageways 20 and 22, and 29 for flow passageways 21 and 23) in the central electrode region 15 of the core are stacked on one another and are laterally coextensive of one another. However, each tier 28 (and 29) in the direction of the flow passageways at the inlet manifolding sections 16 (and 17) projects beyond the central electrode region 15, while the other tier 29 (and 28, respectively) terminates at the edge of the central core region. Thus, the tiers 28 (and 29) are spaced apart from one another at the manifolding regions 16 (and 17) by the distance normally occupied by the missing other tier 29 (and 28, respectively). Those spaces, defined in effect between adjacent pairs of electrolyte walls 24 forming each respective tier and adjacent the open ends of the flow passageways, serve as means to manifold the gases into the passageways.

Regarding the construction of the manifolding arrangement, the electrolyte wall 24 of each tier overlying interconnect wall 26 (and 27) terminates in the vicinity between the electrode region 15 and the manifolding region 16 (and 17); while the electrolyte wall 24 of each tier underlying its interconnect wall 26 (and 27) extends beyond the electrode region in line with the direction of the flow passageways to approximately half way across the width of this manifolding region, whereupon it transverses the space to the upper side of adjacent similar type tier and the same extends then in contact with the interconnect wall thereof and becomes part of this adjacent tier. This defines two separated manifolding chambers 30 and 32 (31 and 33) that extend transverse to the flow passageways 20 and 22 (21 and 23); where chamber 30 (and 31) underlying the electrolyte wall is open via the flutes in the directly exposed interconnect wall 26 (and 27) to the upper flow passageways 20 (and 21) of the underlying tier, while chamber 32 (and 33) overlying the electrolyte wall is open via the flutes in the directly exposed interconnect wall to the lower flow passageways 22 (and 23) of the overlying tier.

Side wall 38 (and 39) closes off the open side of the chamber 32 (and 33) and side walls 40 (and 41) close off the open ends of the chambers 30 and 32 (and 31 and 33). Separated ducts 46 and 47 (and 49) extend transverse to the flow passageways and to the electrolyte walls adjacent the manifolding chambers. The two separated ducts 46 and 47 communicate with the manifold chambers 32 and 33, respectively, and the single vertical duct 49 communicates with both manifold chambers 30 and 31, each communication being through appropriate openings (not shown) in the ducts 46, 47, and 49 and the appropriate side walls 40 and 41. The ducts 46 and 47 in turn are connected to inlet pipe 50 while duct 49 is connected to inlet pipe 52 for bringing the fuel and oxidant gases to the fuel cell.

In the illustrated fuel cell, all of the flow passageways 20 (and 21) overlying the interconnect wall 26 (and 27) of its tier are for the fuel gases and all of the flow passageways 22 (and 23) underlying the interconnect wall of its tier are for the oxidant gases. The flow passageways 20 and 21 are thus formed with only anode electrode material 60 (see FIG. 4) defining the exposed walls of the passageways operable thereby to receive the fuel; while the flow passageways 22 and 23 are formed with only cathode electrode material 62 defining the exposed walls of the passageways operable thereby to receive the oxidant. The anode material 60 is separated from the cathode material 62 at certain locations within the core (at the electrolyte walls 24) by a thin sheet or layer of electrolyte material 64 to form the electrolyte walls 24 or "cell". A voltage potential will build up across this electrolyte wall 24 between these electrodes 60 and 62 in the presence of fuel and oxidant. This potential occurs as the fuel in the anode passageways 20 and 21 and the oxidant in the cathode passageways 22 and 23 electrochemically combine across the electrolyte 64. The voltage is small for each anode and cathode electrode combination (or electrolyte wall 24), generally less than 1.0 volt, and even this voltage drops off when external current draw is taken from the electrodes.

At other locations within the core (at the interconnect walls 26 and 27), the anode material 60 and cathode material 62 are separated by a generally thin sheet or layer of inert support material 66, and a plurality of small plugs of interconnect material 68 are extended through the support material 66 to electrically contact the sandwiching layers of anode 60 and cathode 62. The small plugs 68 of interconnect material are arranged in a uniform matrix across the entire area of the interconnect walls 26 and 27. The defined interconnect walls 26 and 27 serves to isolate the fuel and oxidant gases from one another, and also to electrically connect together the anode electrode 60 of one cell and the cathode electrode 62 of the adjacent cell. This creates thereby a series circuit with the adjacent cells, and thereby progressively accumulates the small voltages of the separate cells.

The anode 60 and cathode 62 in the electrolyte walls 24 are porous to the degree required to allow the fuel and oxidant gases confined on the opposite sides thereof to electrochemically combine, while the electrolyte 64 and interconnect walls 26 and 27 (both the inert support material 66 and the interconnect plugs 68) are impervious and serve to isolate the fuel and oxidant gases physically from one another. Likewise, the electrolyte material 64 is electronically nonconductive as between the anode 60 and cathode 62 formed on its opposite sides, but the electrolyte material does provide ionic conductivity between the anode and cathode in the presence of fuel and oxidant; and moreover both the anode 60 and cathode 62 are electrically conductive. On the other hand, each interconnect wall electronically connects the anode 60 and cathode 62 on its opposite sides together, simulating a series connection of adjacent cells with one another, while blocking the transfer of oxygen ions.

Thus, in the embodiment illustrated, main pipe 52 and duct 49 are adapted to carry gaseous fuel to the manifold chambers 30 and 31 for flow through the passageways 20 and 21 serving as anodes, and main pipe 50 and ducts 46 and 47 are adapted to carry oxidant to the manifold chambers 32 and 33 for flow through the passageways 22 and 23 serving as cathodes. All unconsumed or remaining fuel and reaction products and oxidant from the flow passageways 20 and 22 discharge into manifold chamber 18, and all unconsumed or remaining fuel and reaction products and oxidant from the flow passageways 21 and 23 discharge into manifold chamber 19. These products can be directed by ducts 70 and 72 away from the fuel cell.

Many serially connected anode-cathode cell combinations will be provided, exceeding perhaps even several hundred. The outermost interconnects (or adjacent electrode) of the core 11 are connected electrically via conductors to external terminals 74 and 75 of the fuel cell to provide the cumulative electrical output at the terminals. In FIG. 1, this is illustrated schematically by conductors 76 and 77 connected between terminals 74 and 75, and the uppermost electrode at contacts 80 and the lowermost electrode at contacts 81. The contacts 80 and 81 are preferably located in the fuel passageways to provide a reducing atmosphere to minimize the oxidation of the contacts. Moreover, each of the contacts 80 and 81 is preferably in the form of a brush-like configuration (see FIG. 4) having many thin bristle-like projections or contacts that engage the electrodes 60 of the uppermost and lowermost fuel passageways 20 and 21 while allowing for floating movement of the contacts and passageway surface upon any differential thermal expansion. Typically, a conductor can connect each contact 80 (and 81) to a main buss 82 (and 83), and the conductor 76 (and 77) connects the buss to the terminal 74 (and 75).

In a preferred embodiment of the disclosed fuel cell core 11, each wavy interconnect wall 26 (and 27) is connected along spaced generally parallel line-like contact areas 88 (and 89, see FIG. 4) between corresponding spaced pairs of generally parallel electrolyte walls 24. As noted, this defines the tiers 28 (and 29) of generally parallel flow passageways 20 and 21 (and 22 and 23) for the fuel and oxidant gases. Alternate tiers 28 and 29 are arranged to have the passageways disposed normal to one another. Solid mechanical connection of the interconnect walls 26 (and 27) of adjacent tiers to the opposite sides of the common electrolyte wall 24 therebetween is only at spaced point-like contact areas 90 (see FIG. 3), where the previously mentioned line-like contact areas cross one another.

Also, the support material 66 preferably will constitute between 2 and 98 wt. % of the core, considering only the weight of the active anode 60, cathode 62, electrolyte 64 and interconnect 68 materials. Each layer of the active anode, cathode, and electrolyte material defining the fuel and oxidant passageways is quite thin, while the interconnect wall support material 66 may be of the same thickness or perhaps up to twenty times this. This provides that the expansion characteristics of the core is dominated by the interconnect walls 26 (and 27) and the support material 66, whereby delamination of the thin material layers should be minimized.

It should be noted also that the line contact areas 88 and 89 need not be fused gas-tight, and in fact could preferably be left either as physical gaps or separations, or gas-pervious. With the four point securement of the electrolyte wall 24, as at areas 90 of each interconnect wall crossover, the electrolyte wall is thereby in effect suspended therebetween and is otherwise nonrestrained. This along with the fact that the interconnect walls dominate the thermal expansion characteristics of the core, reduce the thermally induced strain on the electrolyte walls 24. Gas migration is permitted across these gas pervious line-like contact areas 88 and 89 since it would only involve like gases, either the fuel or the oxidant, and would not otherwise adversely affect the operation of the fuel cell.

Under one preferred embodiment, a power cell formed according to this invention would have many separate core passageways, each of relatively small cross section, perhaps only several square mm. The electrolyte layer might be in the range between 0.002 and 0.01 cm in thickness and preferably between 0.002 and 0.005 cm in thickness; while the anode and cathode layers each might be in the range between 0.002 and 0.05 cm in thickness and preferably between 0.005 and 0.02 cm in thickness. The interconnect wall might be in the range between 0.05 and 0.25 cm in thickness. Each interconnect plug might be perhaps 0.001-0.1 cm in diameter and at center spacings in the matrix of 0.1-1.0 cm. The spacing between adjacent electrolyte walls 24 might be 0.02-0.5 cm while the spacing between adjacent line areas of the interconnect electrolyte contact might be of similar distances. The monolithic core construction is believed to provide sufficient structural integrity and dimensional stability even with these wall thicknesses.

The anode 60, cathode 62, electrolyte 64, interconnect 68 and support material 66 for the layers would be matched as closely as possible to one another with respect to each coefficient of thermal expansion so as to minimize separation problems due to differential thermal expansion.

A typical cathode typically would be lanthanum manganite ($LaMnO_3$) the electrolyte would be comprised of yttria-stabilized zirconia ($ZrO_2 + Y_2O_3$); and the anode would be a cobalt yttria-stabilized zirconia cermet or mixture ($Co + ZrO_2 + Y_2O_3$). The interconnect might be comprised for example, of lanthanum chromite ($LaCrO_3$), where the lanthanum manganite ($LaMnO_3$) and lanthanum chromite ($LaCrO_3$) are suitably doped to obtain electrical conductivity. The support material can be cost-effective calcia stabilized zirconia ($CaO + ZrO_2$) or the more costly yttria-stabilized zirconia. The yttria-stabilized zirconia would be preferred for close matching of the thermal coefficients of expansion relative to the electrolyte layer.

All active core materials (the anode, cathode, electrolyte and interconnect) and the support material thus will be integrally bonded or fused together to make the core 11 of a monolithic construction. However, the core 11 is actually formed of the separate materials in a sequential manner, which might take the form of several known approaches. Thus, the separate layers of anode 60, cathode 62 and electrolyte 64 could be tape cast, and layered on one another while pliant and in green form to define the electrolyte wall 24. Likewise the interconnect walls 26 and 27 could be formed with the anode, cathode and support layers extruded or tape cast and the interconnect plugs pressed through the support layer at the approximately spaced matrix locations, and layered on one another, again while yet in a green or pliant stage. The separate walls can then be shaped and layered on one another at the appropriate location and orientations. In this regard, a filler material (not shown) could be used in shaping the interconnect wall, the latter being overlayed and underlayered relative to this filler material to create the ruckles, and this could be laid on an electrolyte wall to form one tier. The alternate tiers of similar construction then can be formed and stacked on one another. Ultimately, the stacked core configuration would be sintered or otherwise fired and heat cured in an oven or the like (not shown) at temperatures approximately 1500°-1800° C. for durations exceeding 1-2 hours and even approaching 20-40 hours, whereby it would become self supporting and dimensionally stable. This would also burn away or vaporize the filler material to leave voids at each intended passageway.

It will be appreciated that in the disclosed core 11, the fuel and oxidant passageways 20 and 22 (and 21 and 23) are laid out to have parallel flow in each tier 28 (and 29) and crosswise flow relative to the alternate tiers 28 and 29. This allows for direct and efficient utilization over the full lengths of the flow passageways while providing for electric potential buildup over the whole stack of cell tiers. The fuel and oxidant gases would flow to the core at the purities and flow rates required, and the remaining unconsumed fuel and reaction products and oxidant would typically be combusted either in the outlet manifolds 18 and 19 or in special combustor (not shown) whereat all available energies of the fuel can be completely utilized and/or burned. Generally, the pressure differential between the inlet and outlet of the fuel or the oxidant (such as between fuel inlet chambers 30 and 31 and the outlet manifolds 19 and 18 is quite low, and the velocity of the gases within or through the passageways 20 and 21 is likewise quite low. Although, the fuel cell is shown with the fuel and oxidant flowing unidirectionally with one another, the direction of gas flow is immaterial to this invention. Thus, by using similar manifolding as illustrated in detail in manifolds 16 and 17 in the manifolds 18 and 19, the oxidant flow (for example) could be reversed to have counter flow of the fuel and oxidant in each tier and cross flow as between the tiers.

While the structure has been disclosed as having only the inlet ends with the separated manifolding for the parallel flow passageways 20 and 22 (and 21 and 23) as a fuel cell, it would be possible to provide separate manifolding for the outlet ends of the flow passageways. Thus, the fuel cell could be operated as an electrolysis cell by admitting steam to one end of the fuel passageways and air to the corresponding end of the oxidant passageways, and in the presence of an electrical potential inputted to the device via the exterior terminals, electrolysis can take place to define hydrogen gas and steam at the outlet end of the fuel passageways and oxygen-enriched air at the outlet end of the oxidant passageways.

The embodiments of the invention in which an exclusive property or privilege is claimed are defined as follows:

1. A fuel cell, comprising the combination of a core having a plurality of electrolyte and interconnect walls arranged to define a plurality of flow passageways, each electrolyte wall having cathode and anode materials sandwiching an electrolyte material, each interconnect wall having cathode and anode materials sandwiching an inert support material and many spaced small plugs of interconnect material extended therethrough which electrically connect the cathode and anode materials together, the walls being arranged whereby only anode material defines one set of the passageways suited for the fuel and whereby only cathode material defines another set of passageways suited for the oxidant, each interconnect wall being wavy and extended between adjacent pairs of generally parallel electrolyte walls and being proximate one another along spaced generally parallel line-like contact areas operable to define one tier of generally parallel alternately adjacent flow passageways for the fuel and oxidant gases, and alternate tiers of the passageways being arranged to have the passageways disposed transverse to one another, whereby the interconnect walls of adjacent tiers connect to the opposite sides of the common electrolyte wall therebetween only at spaced point-like contact areas where the previously mentioned line-like contact areas cross one another.

2. A fuel cell combination according to claim 1, wherein the interconnect and electrolyte walls at the line-like contact areas are fused together.

3. A fuel cell combination according to claim 1, wherein the interconnect and electrolyte walls at the line contact areas are proximate but separate, except at the point-like contact areas where they are fused together.

4. A fuel cell combination according to claim 1, further including means to manifold the fuel and oxidant gases separately to the fuel and the oxidant passageways, said manifolding means comprising extending alternate tiers at the open ends of the flow passageways beyond the other tiers to a manifolding region so as to define therebetween spaces otherwise occupied by the other tiers, dividing each of said spaces in two by crossing same with one of the two electrolyte walls of the tier, said one electrolyte wall being the only electrolyte wall of said alternate tiers in this manifolding region, whereby the separate end chambers defined on opposite sides of the electrolyte wall are open via the exposed interconnect walls to the flow passageways of the overlying tier that underlie the interconnect wall therein and to the flow passageways of the underlying tier that overlie the interconnect wall therein.

5. A fuel cell combination according to claim 1, wherein said cathode is lanthanum manganite (LaMnO$_3$); said anode is cobalt yttria-stabilized zirconia cermet or mixture (Co+ZrO$_2$+Y$_2$O$_3$); said electrolyte is yttria-stabilized zirconia (ZrO$_2$+Y$_2$O$_3$); and said interconnect is lanthanum chromite (LaCrO$_3$); the lanthanum manganite and lanthanum chromite being suitably doped to obtain electrical conductivity, and said support material is calcia stabilized zirconia (CaO+ZrO$_2$) or yttria-stabilized zirconia (ZrO$_2$+Y$_2$O$_3$).

6. A fuel cell combination according to claim 1, wherein each layer of the electrolyte material is of the order of 0.002–0.01 cm thick, wherein each layer of the cathode and anode materials is of the order of 0.002–0.05 cm thick, and wherein each interconnect wall is of the order of 0.05–0.25 cm thick.

7. A fuel cell combination according to claim 6, wherein each interconnect plug is of the order of 0.001–0.1 cm in diameter and at matrix-like center spacings of the order of 0.1–1.0 cm.

8. A fuel cell combination according to claim 6, wherein the spacing between adjacent electrolyte walls 24 is of the order of 0.02–0.5 cm and the spacing between adjacent line-like contract areas of the interconnect and electrolyte walls is of a similar distance.

9. A fuel cell combination according to claim 1, further including means to direct the galvanic output from the anode and cathode materials to an exterior circuit, said last mentioned means comprising brush-like contacts disposed in the fuel passageways of the uppermost and lowermost tiers and frictionally engaging the anode electrode therein, and conductor means from these contacts to exterior terminals for the fuel cell.

10. A fuel cell, comprising the combination of a core having a plurality of electrolyte and interconnect walls arranged to define a plurality of flow passageways, the walls being arranged whereby only anode material defines one set of the passageways suited for the fuel and whereby only cathode material defines another set of passageways suited for the oxidant, certain of the walls being generally planar and parallel to one another and others of the walls being wavy and extended between adjacent pairs of the planar walls and being proximate one another along spaced generally parallel line-like contact areas operable to define one tier of generally parallel alternately adjacent flow passageways for the fuel and oxidant gases, alternate tiers of the passageways being arranged to have the passageways disposed transverse to one another, and means to manifold the fuel and oxidant gases separately to the fuel and the oxidant passageways, said manifolding means including extending alternate tiers at the open ends of the flow passageways beyond the other tiers to a manifolding region so as to define therebetween spaces otherwise occupied by the other tiers, dividing each of said spaces in two by crossing same with one of the two planar walls of the other tier, said one planar wall being the only planar wall of said other tier in this manifolding region, whereby the separate end chambers defined on opposite sides of said one planar wall are open respectively to the flow passageways of the overlying adjacent tier that underlie the other wall therein and to the flow passageways of the underlying adjacent tier that overlie the other wall therein.

11. A fuel cell combination according to claim 10, wherein the electrolyte walls are planar and the interconnect walls are wavy.

12. A fuel cell combination according to claim 11, wherein the interconnect and electrolyte walls at the line contact areas are proximate but separate, except at the point-like contact areas where they are fused together.

13. A fuel cell combination according to claim 11, wherein each electrolyte wall has cathode and anode materials sandwiching an electrolyte material, and wherein each interconnect wall has cathode and anode materials sandwiching an inert support material and many spaced small plugs of interconnect material extended therethrough which electrically connect the cathode and anode materials together.

14. A fuel cell combination according to claim 12, wherein each layer of the electrolyte material is of the order of 0.002–0.01 cm thick, wherein each layer of the cathode and anode materials is of the order of 0.002–0.05 cm thick, wherein each interconnect wall is of the order of 0.05–0.25 cm thick, and wherein each interconnect plug is of the order of 0.001–0.1 cm in diameter and at matrix-like center spacings of the order of 0.1–1.0 cm.

15. A fuel cell combination according to claim 14, wherein said cathode is lanthanum manganite ($LaMnO_3$); said anode is cobalt yttria-stabilized zirconia cermet or mixture ($Co+ZrO_2+Y_2O_3$); said electrolyte is yttria-stabilized zirconia ($ZrO_2+Y_2O_3$); and said interconnect is lanthanum chromite ($LaCrO_3$); the lanthanum manganite and lanthanum chromite being suitably doped to obtain electrical conductivity, and said support material is calcia stabilized zirconia ($CaO+ZrO_2$) or yttria-stabilized zirconia ($ZrO_2+Y_2O_3$).

16. A fuel cell combination according to claim 10, further including means to direct the galvanic output from the anode and cathode materials to an exterior circuit, said last mentioned means comprising brush-like contacts disposed in the fuel passageways of the uppermost and lowermost tiers and frictionally engaging the anode electrode therein, and conductor means from these contacts to exterior terminals for the fuel cell.

17. A fuel cell, comprising the combination of a core having a plurality of electrolyte and interconnect walls operable to define a plurality of flow passageways, the walls being arranged whereby only anode material defines one set of the passageways suited for the fuel and whereby only cathode material defines another set of passageways suited for the oxidant, means to manifold the fuel and oxidant gases separately to the fuel and the oxidant passageways, and means to direct the galvanic output from the anode and cathode materials to an exterior circuit, said last mentioned means comprising brush-like contacts disposed in certain of the fuel passageways and frictionally engaging the anode electrode therein, and conductor means from these contacts to exterior terminals for the fuel cell.

18. A fuel cell combination according to claim 17, wherein certain of the walls are generally planar and parallel to one another and others of the walls are wavy and extended between adjacent pairs of the planar walls and are proximate one another along spaced generally parallel line-like contact areas operable to define one tier of generally parallel alternately adjacent flow passageways for the fuel and oxidant gases, alternate tiers of the passageways being arranged adjacent one another, and the brush-like contacts being disposed in the uppermost and lowermost of the tiers.

19. A fuel cell combination according to claim 18, wherein each electrolyte wall has cathode and anode materials sandwiching an electrolyte material, and wherein each interconnect wall has cathode and anode materials sandwiching an inert support material and many spaced small plugs of interconnect material extended therethrough which electrically connect the cathode and anode materials together.

20. A fuel cell combination according to claim 19, wherein alternate tiers of the passageways are arranged to have the passageways disposed transverse to one another, whereby the interconnect walls of adjacent tiers connect to the opposite sides of the common electrolyte wall therebetween only at spaced point-like contact areas where the previously mentioned line-like contact areas cross one another.

* * * * *